No. 684,071.
A. LINDGREN.
VEHICLE POLE.
(Application filed July 11, 1901.)
Patented Oct. 8, 1901.
(No Model.)
Fig.1.
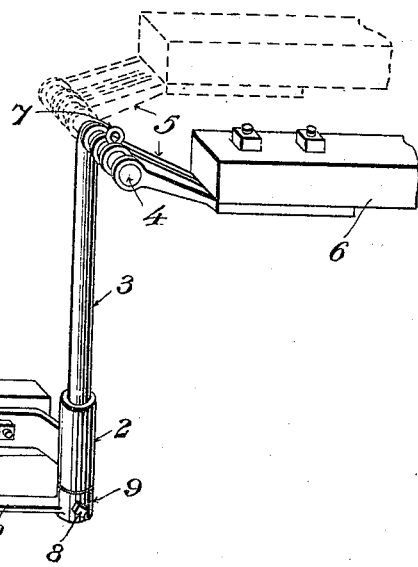
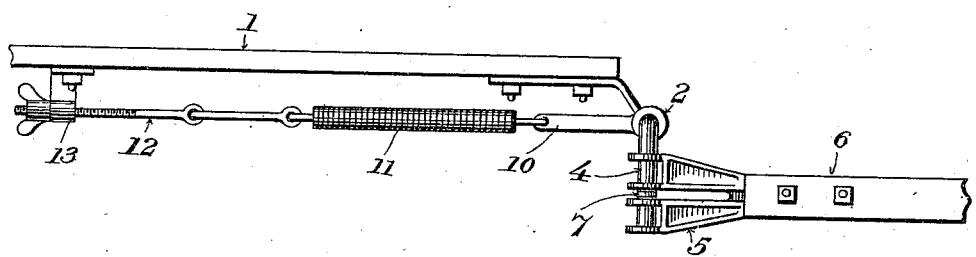
Fig.2.
Witnesses
Inventor
August Lindgren
by P. Dodge
Attorney

UNITED STATES PATENT OFFICE.

AUGUST LINDGREN, OF MOLINE, ILLINOIS, ASSIGNOR TO THE MOLINE PLOW COMPANY, OF ILLINOIS.

VEHICLE-POLE.

SPECIFICATION forming part of Letters Patent No. 684,071, dated October 8, 1901.

Application filed July 11, 1901. Serial No. 67,893. (No model.)

*To all whom it may concern:*

Be it known that I, AUGUST LINDGREN, of Moline, county of Rock Island, and State of Illinois, have invented a new and useful Improvement in Pole Connections for Vehicles, of which the following is a specification.

This invention has reference to vehicle-poles, and is designed more particularly for use in connection with wheeled plows and analogous agricultural machines.

In connection with certain forms of agricultural implements, such as wheeled plows, it is customary under certain conditions to employ a pole for the attachment of the draft-animals and to so connect the pole with the plow beam or frame of the machine that it may pivot on a vertical axis, so that the plow may be turned squarely at corners. It is to this character of machines that my invention is peculiarly applicable; and it consists in combining with a pole a vertical stem pivotally mounted in the frame to turn on a vertical axis and a spring operatively connected with the frame and stem in such manner as to yieldingly resist the motions of the pole and maintain the draft-animals and frame in line.

The invention consists also in connecting the pole with the machine in such manner that it may be shifted in position laterally to accommodate two or three horses, as desired.

The invention consists also in the details of construction and combination of parts hereinafter described and claimed.

In the accompanying drawings, Figure 1 is a perspective view of my invention applied to a plow, the forward portion on the beam only being shown. Fig. 2 is a top plan view of the same.

Referring to the drawings, 1 represents a plow-beam having applied to its forward end a vertical socket 2, in which is loosely mounted to swivel therein on a vertical axis a vertical stem 3, (which I term the "pole-stem,") the upper end of which is bent laterally and transversely of the beam in the form of a horizontal arm 4. This arm is loosely surrounded by the end of a bracket-plate 5, firmly bolted to the rear end of a pole 6, which bracket-plate is so connected with the arm by means of a fastening-bolt 7 that it may be removed when desired, the purpose of which will presently appear.

On its lower end, at the under side of the socket 2, the pole-stem has adjustably fixed to it by means of a fastening-screw 8 a collar 9, from which projects a finger 10, connected with the front end of a spiral spring 11, whose opposite end is connected, by means of an adjustable rod 12, with a bracket 13, depending from the plow-beam. The finger 10 extends longitudinally rearward from the pole-stem at right angles to the lateral arm 4, to which the pole is attached, and the spring acts to maintain the parts yieldingly in this position and to yieldingly resist the tendency of the pole to swing laterally on the vertical stem as an axis. The spring therefore serves as a yielding connection between the pole and the plow-beam, and by its longitudinal pull on the arm it acts to keep the plow in line with the draft-animals when the machine is being transported from field to field, and it serves, when the team is turning corners, to overcome the tendency of the plow to swing around too far.

As shown in the drawings, the stem is so arranged that the lateral arm on its upper end, to which the pole is attached, projects to the furrow side. In this position of the parts three draft-animals may be employed abreast, with two traveling on the unplowed ground. If it is desired that but two horses be employed, it is necessary to shift the position of the pole toward the land, and in the construction shown this is accomplished by reversing the position of the pole-stem in its socket, so that the lateral arm will extend in the opposite direction toward the unplowed ground, as shown by dotted lines in Fig. 1. It will be necessary, of course, to remove the bracket-plate 5 from the arm to permit the latter to be turned, after which the bracket-plate may be again slipped over the arm. It will also be necessary to adjust the finger 10 on the lower end of the stem to conform to the reverse position of the parts, so that it will, as before, extend longitudinally rearward from the stem.

Having thus described my invention, what I claim is—

1. In combination with a frame, a pole, a vertical stem connected to the same and pivotally mounted in the frame to turn on a vertical axis, and a spring acting on the stem.

2. In combination with a frame, a vertical pivotal stem provided with a lateral arm, a pole connected with the arm, a finger on the stem extending longitudinally rearward, and a spring acting on the finger and tending to hold it in its longitudinal position.

3. In combination with a frame, a pole, and an intermediate device connecting the pole detachably with the frame, said intermediate device being adjustable to change the position of the pole with relation to the frame in a transverse direction.

4. In combination with a frame, a vertical pole-stem rotatable on a vertical axis, an arm projecting laterally from the upper end of the stem, and a pole detachably connected with said arm.

5. In combination with a frame, a vertical pole-stem pivotally mounted thereon on a vertical axis, and reversible in position around said axis, a pole detachably connected with said stem, a finger projecting from said stem and adjustable with relation thereto around the axis of the same, and a spring acting on said finger.

In testimony whereof I hereunto set my hand, this 31st day of May, 1901, in the presence of two attesting witnesses.

AUGUST LINDGREN.

Witnesses:
C. H. LIPPINCOTT,
L. C. BLANDING.